(12) United States Patent
Fedulova et al.

(10) Patent No.: US 10,191,352 B2
(45) Date of Patent: Jan. 29, 2019

(54) OPTICAL COMPONENT FOR MODULATING A LIGHT FIELD AND APPLICATIONS THEREOF

(71) Applicants: Max-Planck-Gesellschaft zur Foerderung der Wissenschaften e.V., Munich (DE); Ludwig-Maximilians-Universitaet Muenchen, Munich (DE)

(72) Inventors: Elena Fedulova, London (GB); Oleg Pronin, Garching (DE); Michael Trubetskov, Garching (DE); Kilian Fritsch, Eching (DE); Vladimir Pervak, Munich (DE)

(73) Assignees: Max-Planck-Gesellschaft zur Foerderung der Wissenschaften e.V., Munich (DE); Ludwig-Maximilians-Universitaet Muenchen, Munich (DE)

(*) Notice: Subject to any disclaimer, the term of this patent is extended or adjusted under 35 U.S.C. 154(b) by 39 days.

(21) Appl. No.: 15/451,852

(22) Filed: Mar. 7, 2017

(65) Prior Publication Data
US 2017/0261833 A1    Sep. 14, 2017

(30) Foreign Application Priority Data
Mar. 9, 2016    (EP) .................................... 16000571

(51) Int. Cl.
*G02F 1/01* (2006.01)
*G02F 1/35* (2006.01)
(Continued)

(52) U.S. Cl.
CPC .............. *G02F 1/3511* (2013.01); *G02F 1/21* (2013.01); *G02F 1/355* (2013.01); *G02F 1/3523* (2013.01);
(Continued)

(58) Field of Classification Search
CPC ...... G02F 1/07; G02F 1/3515; G02F 2203/26; G02F 1/3511; G02F 1/3556; G02F 1/21;
(Continued)

(56) References Cited

U.S. PATENT DOCUMENTS 3,517,983 A * 6/1970 Markin .................. G02B 23/12
250/330
5,315,437 A 5/1994 Alfano et al.
(Continued)

FOREIGN PATENT DOCUMENTS

DE    10109084 A1    9/2002

OTHER PUBLICATIONS

Nalwa, Hari Singh. "Organic Materials for Third-Order Nonlinear Optics." Advanced Materials, vol. 5, No. 5, 1993, pp. 341-358.*
(Continued)

*Primary Examiner* — William R Alexander
*Assistant Examiner* — Henry A Duong
(74) *Attorney, Agent, or Firm* — Caesar Rivise, PC (57) ABSTRACT

Optical component (10) for modulating light field (1) incident thereon, particularly amplitude and/or phase in dependency on intensity (I) thereof, includes stack (11) of refractive layers (12, 13) on substrate (14), made of materials having third-order nonlinearity, and having alternatingly varying refractive indices (n), including linear contribution ($n_0$) and non-linear contribution ($n_2$), and determining reflectance and transmittance spectra of the optical component, wherein refractive layers (12, 13) are configured such that reflectance and transmittance of the optical component have a Kerr effect based dependency on intensity (I) of the incident light field with $n=n_0+I \cdot n_2$, and refractive layers (12, 13) are made of at least one of dielectric and semiconductor layers, wherein non-linear contribution ($n_2$) is below $10^{-12}$ $cm^2/W$. A resonator device including the optical component,
(Continued)

a method of modulating a light field using the optical component and a method of manufacturing the optical component are described.

19 Claims, 4 Drawing Sheets (51) Int. Cl.
    *G02F 1/21*     (2006.01)
    *G02F 1/355*     (2006.01)
    *H01S 3/08*     (2006.01)
    *H01S 3/11*     (2006.01)

(52) U.S. Cl.
    CPC ........ *G02F 1/3556* (2013.01); *H01S 3/08059* (2013.01); *H01S 3/1112* (2013.01); *G02F 2203/15* (2013.01)

(58) Field of Classification Search
    CPC .... G02F 1/355; G02F 1/3523; G02F 2203/15; G02F 1/0136; G02F 1/03; G02F 2001/0139; G02F 2001/0142; G02F 2001/0144; H01S 3/107; H01S 3/1112; H01S 3/08059
    USPC ........................................................ 359/258
    See application file for complete search history.

(56) References Cited

U.S. PATENT DOCUMENTS

| | | | |
|---|---|---|---|
| 2003/0118060 A1* | 6/2003 | Spuehler | H01S 3/1118 372/18 |
| 2007/0236799 A1 | 10/2007 | Tateno | |
| 2015/0160481 A1* | 6/2015 | Park | G02F 1/017 348/47 |

OTHER PUBLICATIONS

Brzozowski et al. (2000). Optical signal processing using nonlinear distributed feedback structures. IEEE Journal of Quantum Electronics, 36(5): 550-555.

Husakou et al. (2007). Steplike transmission of light through a metal-dielectric multilayer structure due to an intensity-dependent sign of the effective dielectric constant. Physical review letters, 99(12): 127402:1-127402:4.

Grigoriev et al. (2010). Bistability, multistability and non-reciprocal light propagation in Thue-Morse multilayered structures. New Journal of Physics, 12(5), 053041: 1-20.

Leuthold et al. (2010). Nonlinear silicon photonics. Nature Photonics, 4(8): 535-544.

Lin et al. (2007). Nonlinear optical phenomena in silicon waveguides: modeling and applications. Optics Express, 15(25):16604-16644.

Moshonas et al. (2014). Simulation and properties of highly nonlinear multilayer optical structures using the transmission line method. SPIE Photonics Europe. International Society for Optics and Photonics: 913129:1-913129:11.

Tikhonravov et al. (1996). Application of the needle optimization technique to the design of optical coatings. Applied optics, 35(28): 5493-5508.

Tikhonravov et al. (2012). Modern design tools and a new paradigm in optical coating design. Applied optics, 51(30): 7319-7332.

Tikhonravov, A. V. (2003). Design of optical coatings. In N. Kaiser and H. K. Pulker (Eds.) "Optical interference coatings", Springer 81-104.

Waldecker et al. (2015). Time-domain separation of optical properties from structural transitions in resonantly bonded materials. Nature materials, 14(10), 991-995.

English language abstract for DE 10109084 A1 (2002).

European Search Report from corresponding EP 16000571 dated Sep. 7, 2016.

* cited by examiner

OPTICAL COMPONENT FOR MODULATING A LIGHT FIELD AND APPLICATIONS THEREOF

CROSS-REFERENCE TO RELATED APPLICATIONS

This application claims priority from EP 16 000 571.6 filed Mar. 9, 2016, which is incorporated herein by reference in its entirety.

FIELD OF THE INVENTION

The present invention relates to an optical component for modulating a light field, in particular for modulating at least one of an amplitude and a phase of the light field, an optical resonator device including the optical component, a method of modulating a light field, in particular at least one of an amplitude and a phase of the light field, e.g., in the optical resonator device, and a method of manufacturing the optical component. Applications of the invention are available e.g., in the fields of ultrafast laser techniques.

BACKGROUND OF THE INVENTION

In the present specification, reference is made to the following publications cited for illustrating prior art techniques, in particular with regard to optically non-linear components and applications thereof in ultrafast laser techniques.
[1] L. Brzozowski et al. in "IEEE J. Quantum Electron. 36(5), 550-555 (2000);
[2] J. Leuthold et al. in "Nature Photon." 4, 535-544 (2010);
[3] Q. Lin et al. in "Opt. Express" 15, 16604-16644 (2007);
[4] L. Waldecker et al. in "Nat. Mater. Nature Publishing Group" (2015), NMAT4359;
[5] V. Grigoriev et al. in "New Journal of Physics" 12, 053041 1367-2630/10/053041 (2010);
[6] N. Moshonas et al. in "Proc. of SPIE" Vol. 9131 913129-1 (2014);
[7] N. Kaiser and H. K. Pulker "Optical interference coatings" Springer, 2013, A. V. Tikhonravov, chapter "Design of Optical Coatings", pp. 81-104;
[8] A. V. Tikhonravov et al. in "Appl. Opt." 35, 5493-5508 (1996); and
[9] A. V. Tikhonravov et al. in "Appl. Opt." 51, 7319-7332 (2012).

It is generally known that optical multilayer coatings, e.g., allowing precise control of group delay dispersion (GDD) characteristics over more than one octave or providing high-damage-threshold broadband characteristics are incorporated into the majority of ultrafast lasers, in particular femtosecond lasers. Ultrafast lasers have enabled unprecedented quality in micro-machining applications, have considerably increased medical capabilities and have brought imaging techniques like multiphoton fluorescence microscopy and optical coherence tomography to a new level. Furthermore, ultrafast lasers are unique tools in research applications in fields like attosecond physics, frequency comb metrology and femtochemistry.

Current femtosecond laser oscillators yield average output powers of several hundreds of W and pulse energies several tens of μJ at repetition rates of more than 10 MHz. These laser parameters correspond to peak powers >50 MW, thus outperforming even some laser-amplifiers. At such intense optical fields, non-linearities in interference coatings may be revealed and exploited. Various non-linear components are used in laser physics, which can be divided into two general classes: firstly, components based on non-linear absorption with finite relaxation time, and secondly, components based on instantaneously (<5 fs time scale) occurring non-linear response.

The first class includes components comprising a stack of metallodielectric layers (MDS) and numerous kinds of (real) saturable absorbers. MDS components have a significant non-linear optical response so that they are suitable in particular for providing non-linear mirrors having an amplitude dependent reflectance. However, applications of these mirrors are restricted to the visible spectral range, which is outside the range of interest of multiple ultrafast laser applications. Furthermore, MDS components may have disadvantages in terms of a step-like dependency of the output intensity on the input and a slow recovery after irradiation on a time scale of about 20 ps.

Semiconductor saturable absorber mirrors (SESAM) of the first class have been widely used for mode-locking in laser oscillators, however, finite relaxation time prevents the generation of pulses shorter than 700 fs in Yb:YAG lasers. Moreover, they are strongly wavelength dependent, difficult to grow and characterize, introduce non-saturable losses, reveal two-photon absorption (TPA) processes, have rather moderate modulation depth for high power operation (less than 2%), have low damage threshold and are quite expensive.

The second class includes artificial saturable absorber components and components based on the instantaneous Kerr effect. Artificial saturable absorber components include e.g., single-mode fibers exploiting non-linear phase shifts for additive-pulse mode-locking, or components using Kerr lensing in a gain medium. Due to broad bandwidth, these techniques have advantages over SESAMs for generating shorter pulses. Nevertheless, they impose serious constraints on the cavity design and alignment sensitivity.

The nearly instantaneous nature of the electronic non-linear response (due to Kerr effect and TPA) of silicon leads to many applications related to high-speed optical-signal processing [2, 3]. As a further matter, a recent study [4] has shown that optical modifications of a phase-change material $Ge_2Sb_2Te_5$ (GST) are one order of magnitude larger than those achievable with silicon and present a new route to high-speed optical modulators for communications and computations. Furthermore, alternating layers of materials possessing opposite Kerr non-linearities have been modelled and analytically analyzed [5]. Dielectric quasicrystals have been theoretically studied and found to demonstrate an interplay between the intrinsic spatial asymmetry of the structure and Kerr non-linearity causing bistability and multistability of transmission (whereas the reflection has not been studied) sensitive to the propagation direction [5]. Besides, the presented components require an auxiliary pump signal in order to have no limitations of the maximum value of transmission.

Another optical component of the second class, comprised of successive thin-film layers possessing high values of non-linear susceptibility, has been numerically investigated [6]. Specifically, optical bistability which translates to a change in the value of reflectivity with the increasing input power might have been observed. The authors of [6] considered doped polymer films PPAA (push-pull aromatic azobenzene) possessing a non-linear Kerr refractive index as high as about $1.7 \times 10^{-6}$ $cm^2/W$, which was plugged into the calculations as $-1.7 \times 10^{-6}$ $cm^2/W$ and most probably have led to an improper result. The behavior of another Bragg structure comprised by 30 pairs of linear layers of transparent ceramic $Sc_2O_3$ and layers of antiferromagnetic $Co_3O_4$ having a non-linear refractive index of $1\times10^{-6}$ cm$^2$/W at 405 nm has been numerically studied in [6] as well. Moreover, the authors of [6] predicted a hysteresis phenomenon when strong non-linearity is present.

The structure described in [6] has not been put into practice, probably due to simulating the non-linear response of exotic materials, whose non-linear refractive indices are indeed rather high, but unrealistic for practical applications. Moreover, Moshonas et al. [6] have oversimplified the situation in the calculations: The authors have not considered possible issues related to nonlinear absorption processes, arising together with the desired change of refractive index induced by the external optical irradiation.

Objective of the Invention

The objectives of the invention are to provide an improved optical component for modulating a light field, an improved optical resonator device, an improved method of modulating a light field, in particular in an optical resonator device, and/or an improved method of manufacturing the optical component, which are capable of avoiding disadvantages and limitations of conventional techniques. In particular, the objective is to modulate a light field incident on the optical component within an extended spectral range, in particular in near infrared or infrared wavelength range, with a time response on a reduced time scale, with improved capability of precisely and reproducibly adjusting non-linear features and/or with more prominent non-linear effects, while avoiding laser-induced breakdown of the component.

SUMMARY OF THE INVENTION

The above objectives are solved by an optical component, an optical resonator device and methods of the invention.

According to a first general aspect of the invention, the above objective is solved by an optical component, which is configured for modulating a light field incident on the optical component, in particular for changing at least one of amplitude and phase of the light field in reflection and/or transmission in dependency on the amplitude of the incident field, and which comprises a stack of refractive layers being arranged on a substrate. The refractive layers are made of materials having a third-order non-linearity, and they are arranged with alternatingly varying refractive indices. Preferably, the refractive layers are arranged such that the refractive indices are alternatingly increasing and decreasing. The refractive index (n) of each refractive layer includes a linear contribution ($n_0$) and a non-linear contribution ($n_2$). The optical component, in particular the stack of refractive layers thereof, has reflectance and transmittance spectra determined by the materials, refractive indices and thicknesses of the refractive layers.

Furthermore, the refractive layers are configured with taking into account that reflectance (or: reflectivity) and transmittance (or: transmissivity) of the optical component have a Kerr effect based dependency on the intensity (I) of the incident light field with $n=n_0+I\cdot n_2$ (I being proportional to the square of the amplitude).

According to the invention, the refractive layers are made of at least one of dielectric and semiconductor layers.

Furthermore, the materials of the refractive layers are selected such that the non-linear contribution ($n_2$) of the refractive indices is below $10^{-12}$ cm$^2$/W.

According to a second general aspect of the invention, above objective is solved by an optical resonator device, including a plurality of cavity mirrors spanning a resonator beam path, and at least one optical component according to the above first general aspect of the invention. Preferably, the at least one optical component can be arranged as a reflective and/or as a transmissive component in the optical resonator device. Advantageously, the optical resonator device can be provided with a compact structure while having new functions fulfilled by the at least one optical component.

According to a third general aspect of the invention, the above objective is solved by a method of modulating a light field, preferably having a predetermined center wavelength in near-infrared (NIR) or infrared (IR) spectral range, comprising steps of directing the light field on the optical component according to the above first general aspect of the invention and providing the modulated light field in reflection and/or transmission relative to the optical component. The incident light field has an intensity such that the stack of the refractive layers provides an optically non-linear response to the incident light. The intensity of the incident light field is selected such that the reflected or transmitted light has an intensity and/or phase, which depends on the intensity of the incident light field. Preferably, the intensity is just below a damage threshold of the stack of the refractive layers.

According to a fourth general aspect of the invention, the above objective is solved by a method of manufacturing the optical component according to the above first general aspect of the invention by depositing the stack of refractive layers on a substrate. Advantageously, a broad range of deposition methods is available which allow the production of dense layers with excellent homogeneity, high reproducibility and high stability. Preferably, magnetron beam sputtering is used for depositing the refractive layers. Advantageously, this method allows a precise time-controlled monitoring of deposition process parameters resulting in an extremely high accuracy of layer thicknesses and correspondingly an improved capability of precise and reproducible non-linear modulation of light fields by the optical component.

Advantageously, the materials and non-linear refractive indices selected for the inventive optical component result in a well-defined increase or decrease of the component's reflective or transmissive response and/or controlled change of light field phase. The alternating layers of either dielectric or semiconductor materials, or a combination thereof provide the inventive optical component with a definite non-linear pre-damage behavior. The inventors have found that with the non-linear refractive index below $10^{-12}$ cm$^2$/W, which is in contrast to higher non-linear refractive indices of the structures considered in [6], effects of non-linear absorption in the layer stack are suppressed. Accordingly, temperature effects are significantly suppressed and the optical component can be adapted for practical applications with enhanced non-linear behavior, controlled GDD and increased reliability and precision. Additionally, it has been demonstrated that the non-linearity is based on the optical Kerr effect and therefore has a very fast response time, preferably at least below 1 ps and particularly below 10 fs. With the currently available characterization setup response time of about 1 ps has been measured and is limited by the characterization laser pulse duration. The inventive optical components prove useful for mode-locking of solid state lasers, and can be used as spatial or temporal (noise eater) filters, limiters and stabilizers.

Generally, a refractive index change ($\Delta n$) is always associated with the non-degenerate non-linear absorption ($\Delta \kappa$)

and vice versa as stated by the Kramers-Kronig transformation based on the principle of causality. Note that the change of absorption coefficient (Δκ) may be negligibly small. Thus, along with the desired change of refractive index, the external optical perturbation inevitably causes the absorption coefficient changes, which subsequently would lead to an intensity-dependent temperature rise. Non-linear absorption processes may even prevail for the response of the whole structure, if materials with high values of $n_2$ and correspondingly low bandgap are used, e.g., as in [6]. On the contrary, for the materials used with the inventive optical component, in particular with values of $n_2$ below $10^{-12}$ cm$^2$/W (correspondingly higher bandgap), multi-photon absorption can be avoided or significantly suppressed. Naturally, this strongly depends on the excitation wavelength (photon energy). The closer the photon energy to the bandgap, the higher the probability of the multiphoton absorption.

Advantageously, the inventive optical component is a multilayer dielectric and/or semiconductor coating exhibiting a strong non-linearity. This coating created on a substrate shows increasing reflectance and decreasing transmissivity for increasing intensity (or, in an alternative embodiment, correspondingly decreasing reflectance and increasing transmittance for increasing intensity). Accordingly, the inventive optical component is called Multilayer Amplitude Modulator (MAM).

According to a preferred embodiment of the invention, the stack of refractive layers is configured such that the reflectance and transmittance spectra of the optical component have a slope section including the center wavelength of the light field. Advantageously, the observable non-linear change of reflectance and/or transmittance is enhanced in the slope section.

A slope steepness m can be estimated by $m=|(B_1-B_2)/(A_2-A_1)|$, where $[A_1, B_1]$ and $[A_2, B_2]$ are the coordinates (values in arbitrary units) of the highest and lowest parts of the spectrum curve accordingly. Particularly preferred, the stack of refractive layers is configured such the slope section has a slope steepness of at least 5, in particular at least 7.

Advantageously, the refractive layers can be adapted such falling or rising slopes of the reflectance/transmittance spectra and the center wavelength of the incident light are matched relative to each other. According to the first variant, the refractive layers are configured such that the slope section has decreasing reflectance and increasing transmittance at increasing wavelengths, and the reflectance and the transmittance of the optical component are increasing and decreasing, resp., at increasing amplitudes of the incident light field. Alternatively, according to a second variant, the refractive layers are configured such that the slope section has increasing reflectance and decreasing transmittance at increasing wavelengths, and the reflectance and the transmittance of the optical component are decreasing and increasing, resp., at increasing amplitudes of the incident light field. Advantageously, different functions can be fulfilled by the optical component adapted for one of the two variants. For instance, such a device can be used for mode-locking and operate in transmission (laser beam goes through the coating) or in reflection as one of the folding resonator mirrors of an optical resonator.

According to further preferred features of the invention, the slope section of the reflectance and transmittance spectra is at least one of an edge section and a resonance section of the spectra. The edge and resonance sections typically have different slopes. Matching the center wavelength of the incident light and the at least one of the edge and resonance sections allows an adaptation of the non-linear effect to be obtained to the particular task of the optical component.

Alternatively, the stack of refractive layers is configured such that the center wavelength of the light field is included in the middle of the reflectance and transmittance spectra of the optical component (plateau section of the spectra). Advantageously, this results in a broader bandwidth reflection or transmission operation, compared with the embodiment where the center wavelength of the light field is included in a slope section of the spectra.

The stack of alternating refractive layers can be made of dielectric materials, semiconductor materials, or dielectric materials and semiconductor materials. Preferably, the dielectric layers are made of at least one of $Ta_2O_5$, $Nb_2O_5$, $HfO_2$, $TiO_2$, $ZrO_2$, $Al_2O_3$ and $SiO_2$, and/or the semiconductor layers are made of at least one of Ge, Si and ZnSe. These materials have particular advantages in terms of available deposition techniques, providing the non-linear refractive index below $10^{-12}$ cm$^2$/W and available investigations of femtosecond pre-damage dynamics.

According to further preferred features of the invention, the number of the refractive layers is at least 2, e.g., 5 or more, in particular at least 10, and/or at most 1000, in particular at most 100. Furthermore, the thickness of the whole structure of the refractive layers preferably is at least 1 nm, in particular at least 5 nm, and/or at most 1000 μm, in particular at most 15 μm.

If, according to further particularly preferred feature of the invention, the substrate has a thickness below 500 μm, in particular below 300 μm, advantages in terms of minimizing substrate effects on the function of the optical component and in particular suppressing self-focusing in the substrate are obtained. Preferably, the substrate is made of fused silica, sapphire, Si, or ZnSe.

Advantageously, multiple design options are available for selecting the thicknesses of the refractive layers. According to a first variant, all refractive layers can have the same optical thickness. According to further variants, all refractive layers of the same material (dielectric or semiconductor) can have the same thickness, or the refractive layers can have different thicknesses.

According to another, particularly preferred embodiment of the invention, the stack of refractive layers can include at least one full-wave cavity being resonant at least at the center wavelength of the light field. In other words, the thickness of at least one refractive layer and the center wavelength of the light field are matched such that the respective at least one refractive layer and the adjacent refractive layers with different refractive indices provide a resonator inside the layer stack. Advantageously, the resonator provides a field enhancement within the stack of refractive layers, so that non-linear effects can be obtained even with moderate intensities of incident light.

Advantageously, the invention allows overcoming the wavelength limitations of conventional MDS components. Preferably, the refractive layers of the inventive optical component are configured such that the reflectance and transmittance spectra include a wavelength in a range of at least 500 nm and/or at most 10 μm. With a preferred example, the refractive layers are adapted for non-linear reflectance and/or transmittance for wavelengths of at least 600 nm. Particularly preferred, the slope section of the reflectance and/or transmittance is located in the range above 600 nm.

The inventors use the fact that the longer the wavelength, the less probability of the multiphoton absorption and other intensity-dependent absorption effects, which occur to be limiting factors for non-linear optical processes. Non-linear response free of intensity-dependent absorption, based purely on the instantaneous change of the non-linear refractive index $n_2$ is obtained at longer wavelengths. Semiconductor materials are especially interesting in the IR range due to their transparency and high non-linear refractive indices. Besides, higher intensities can be applied at longer wavelengths.

BRIEF DESCRIPTION OF THE DRAWINGS

Further details and advantages of the invention are described in the following with reference to the attached drawings, which show in.

DESCRIPTION OF THE PREFERRED EMBODIMENTS

Figure 1:
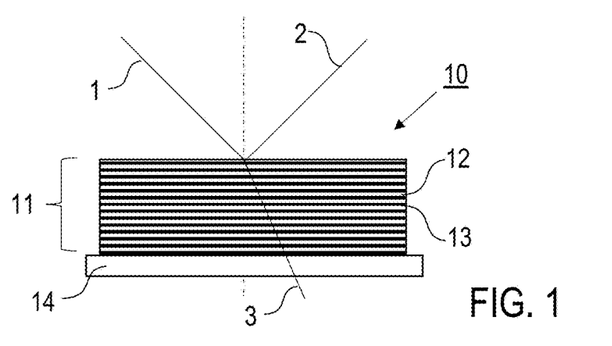
FIGS. 1 to 3: schematic illustrations of stacks of refractive layers according to preferred embodiments of the invention.
Figure 2:
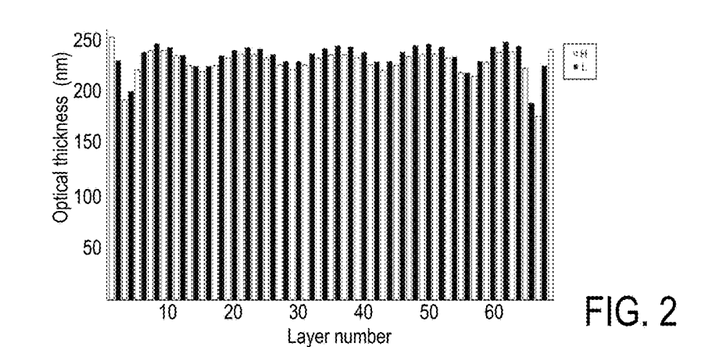
Figure 3:
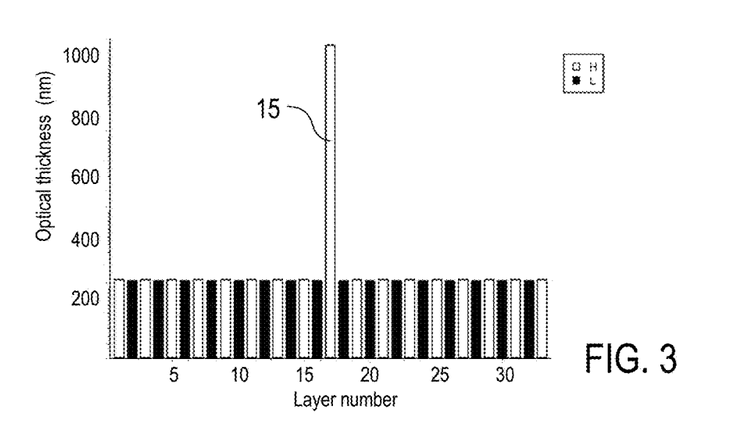
Figure 8:
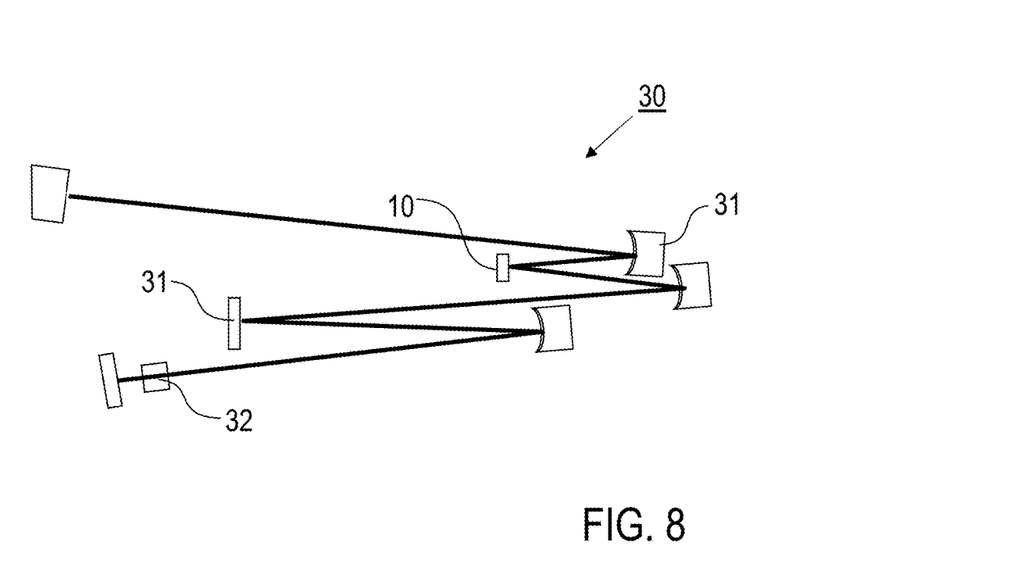
FIGS. 8 and 9: schematic illustrations of an optical resonator device according to preferred embodiments of the invention.
Figure 9:
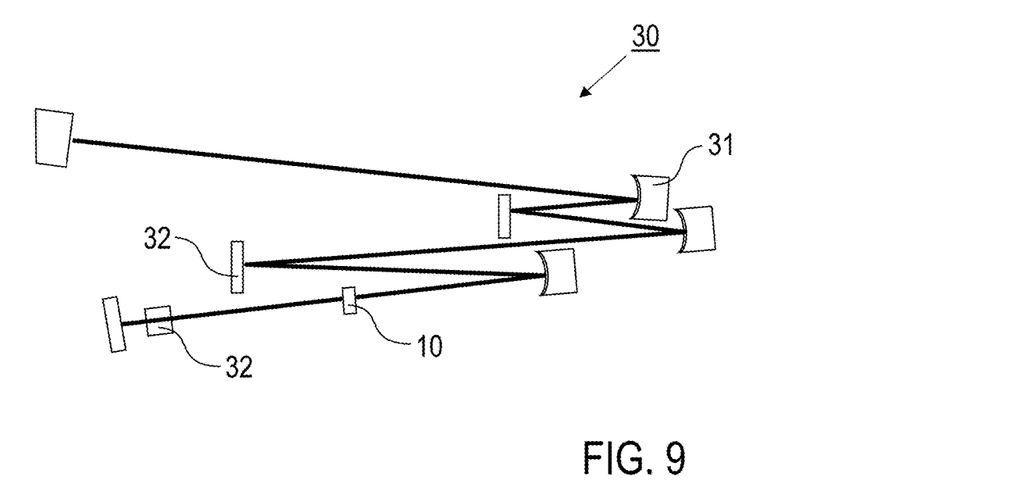

Features of preferred embodiments of the invention are described in the following with reference to the design of the optical components as illustrated in FIGS. 1 to 3 and the applications of the optical components as illustrated in FIGS. 8 and 9. It is noted that the implementation of the invention is not restricted to the optical components illustrated in an exemplary manner. In particular, embodiments of the invention can be modified with regard to the number, thickness and material of the refractive layers. Furthermore, the inventive optical components can be used not only in optical resonators, but also in other optical set-ups, e.g., laser amplifiers, or as laser spatial filters.

According to the invention, it is possible to exploit the optical Kerr effect to provide components working in transmission and components working in reflection. Exemplary reference is made to optical components working in reflection. Optical components working in transmission are configured in an analogue way.

The practical configuration of an inventive optical component (MAM) is designed using a simulation software calculating the number of the refractive layers, the refractive indices thereof and the thicknesses thereof in dependency on the reflectance and/or transmittance of the layer stack and the reflectance change to be obtained. This calculation includes solving an optimization problem which is based on introducing a merit function (F(X), see e.g., according to [7]), estimating the proximity of designed spectral characteristics to target ones. The software solving the optimization problem utilizes approaches such as needle optimization and gradual evolution algorithms [8, 9], avoiding problems of convergence at a local minimum. Subsequently, the optical component is manufactured using the result of the calculation. As an example, the simulation software comprises a commercial OptiLayer software package (www.optilayer.com).

The inventive optical component has an intensity dependent reflectance, transmittance and/or phase. The intensity of the incident light field, which is required for obtaining this optically non-linear behavior, is provided for each practical implementation by numerical simulations on the basis of the features of an optical component practically used, or by test measurements with the optical component.

FIG. 1 schematically shows an embodiment of an optical component 10, comprising a stack 11 of refractive layers 12, 13 with alternating refractive indices, being arranged on a substrate 14. The refractive layers 12 (drawn with white lines, comprising e.g., semiconductors) have a higher refractive index compared with the refractive layers 13 (drawn with black lines, comprising e.g., dielectrics). Alternatively, other materials can be combined, e.g., exclusively dielectric materials or exclusively semiconductor materials, as well as dielectric/semiconductor structures.

The optical component 10 is arranged to be irradiated with incident light 1 having a center wavelength and for reflecting (2) and/or transmitting (3) the incident light. It is noted that the reflected/transmitted light (2/3) is schematically illustrated only. In practice, all of the refractive layers 12, 13 contribute to the reflected light, i.e., the incident light partially propagates through the stack 11. The reflected light 2 is a superposition of all contribution from the refractive layers 12, 13.

With a practical example, the optical component 10 is produced using magnetron sputtering technique (Helios, Leybold Optics). For the optical component 10 working at a center wavelength 1030 nm, the dielectric materials used for magnetron sputtering manufacturing comprise $Ta_2O_5$, $Nb_2O_5$, and $SiO_2$ (e.g., 69 layers with a thickness of 9300 nm), while the semiconductor materials comprise Ge and ZnSe (e.g., 70 layers with a thickness of 8000 nm). Semiconductor materials such as Ge or Si in combination with ZnSe can be used when creating optics for longer wavelengths (around 2 µm). The produced samples were characterized with the help of an industrial spectrophotometer (Perkin Elmer Lambda 950) and a home-built white-light interferometer (WLI) (see FIG. 5, below).

FIGS. 2 and 3 schematically illustrate the optical thicknesses (geometrical thickness multiplied with refractive index) within the stack of refractive layers. According to FIG. 2, the refractive layers have varying optical thicknesses, while FIG. 3 shows an example, wherein a full-wave cavity 15 is formed within the stack of refractive layers having identical optical thickness.

The optical component 10 is designed on the basis of the following theoretical considerations. The optical Kerr effect is a non-linear optical effect which occurs when intense light propagates in media possessing third-order non-linearity. Using the Kerr effect has particular advantages as it predicts an increase of reflectance for higher intensities and ultrashort (several fs) time response—two incredibly important parameters for modern ultrafast solid-state lasers. The Kerr effect physically originates from a non-linear polarization generated in the medium, which itself influences the propagation properties of the light. It is the effect of an instantaneously occurring non-linear response, which is described by the following formula:

$$n = n_0 + I \cdot n_2 \quad (1)$$

where $n_0$ is the linear refractive index, $n_2$ is the second-order non-linear refractive index of the medium, and I is intensity of the light. Put simply, the refractive index growth consequently leads to higher reflectance values. Therefore, non-linear effects are observed before approaching the damage threshold of the coating.

The non-linear refractive index depends on the proximity of a test wavelength to the bandgap, and scales in proportion to the inverse fourth power of the bandgap energy $E_g$:

$$n_2 \sim E_g^{-4} \quad (2)$$

For transparent crystals and glasses, $n_2$ is normally of the order of $10^{-16}$ cm$^2$/W to $10^{-14}$ cm$^2$/W. Thorough studies of non-linear refractive indices of the dielectric materials preferably used for the inventive optical component have not been presented in the available literature. The bandgap energies of high-index dielectric materials $Ta_2O_5$, $Nb_2O_5$ and $HfO_2$ are known to be 3.8, 3.9 and 5.1 eV respectively, which allows one to conclude that the typical values of $n_2$ do lie between $10^{-16}$ cm$^2$/W and $10^{-14}$ cm$^2$/W.

Semiconductor materials possess rather high non-linear index values. Si and Ge, for instance, are known to have strong third-order non-linear optical coefficients with reduced TPA in the IR spectral range. The non-linear refractive index of a single-crystal ZnSe in the 1200-1950 nm region is known to be between about $1.6 \times 10^{-14}$ and about $0.9 \times 10^{-14}$ cm$^2$/W.

Figure 4:
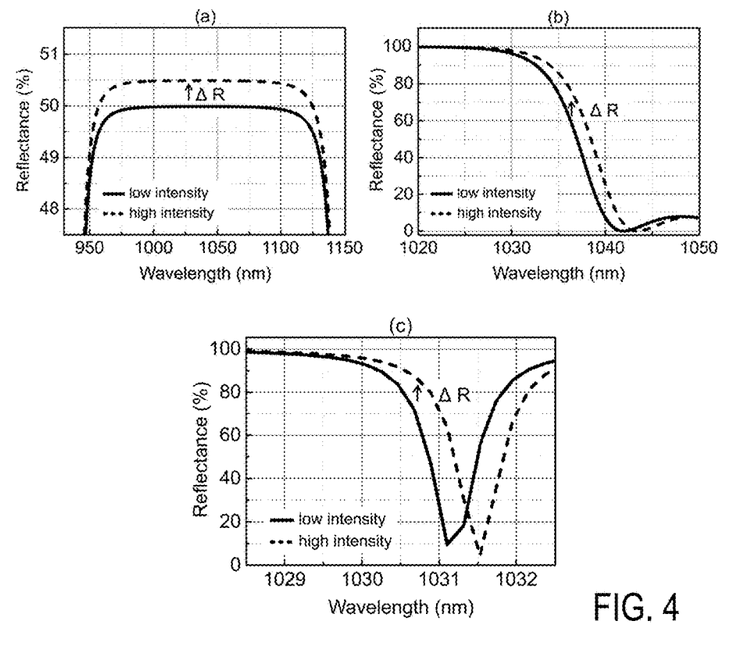
FIG. 4: graphical representations of changing reflectance spectra with the inventive method of modulating an amplitude of a light field.

Depending on the relationship of the reflectance spectrum of the optical component 10 and the center wavelength of the incident light 1 (see FIG. 1), several types of optical components operating in reflection can be provided, in particular optical components working in the middle of the reflectance spectrum (type I), and optical components working on a steep slope of the reflectance spectrum (type II). The Kerr effect of types I and II is illustrated in FIG. 4, which presents numerical simulations of intensity dependent changes of reflectance spectra of a MAM, e.g., as shown in FIG. 1. The reflectance spectra are calculated with the commercial Opti-Layer software package (www.optilayer.com).

FIG. 4(a) shows an example of a broadband MAM working in the middle (plateau section) of the reflectance zone (type I), while FIGS. 4(b) and 4(c) show examples of a MAM working at an edge structure (long wavelength end of reflectance spectrum, type II) and a resonant structure (within the reflectance spectrum, type II). The type II design, in particular if the slope is at least 5, is extremely sensitive to the change of refractive index. The GDD of such structures is carefully tailored and remains nearly constant in the desired wavelength range, e.g., if used for mode-locking of lasers (see FIG. 5(b)). Additionally or alternatively, it is possible to create an edge structure with an opposite slope resulting in decreasing reflectance (increasing transmittance) for increasing laser intensity. As an example, the MAM can work at an edge structure at the short wavelength begin of reflectance spectrum.

An important advantage of the type I MAM (FIG. 4(a)) designed for reflection operation is its broad bandwidth, which can result in the generation of pulses in the range of several fs, although an absolute increase of reflectance can hardly exceed several percent. The type II (FIGS. 4(b) and (c)) of MAM, on the other hand, is extremely responsive to the intensity increase and can reach 20% in particular cases (if the initial reflectance is 50%). Another benefit of these sensitive designs is the possibility to work at the edge itself, the position of which can be easily adjusted by varying the angle of incidence and thus influencing the modulation depth of the device. However, the estimated bandwidth of the example "edge structure" design (FIG. 4(b)) is 10 nm, which would limit the pulse durations down to 100-200 fs.

A basic example of a resonant structure (FIG. 4(c)) consists of two stacks of refractive layers enclosing a full-wave cavity 15 in between (Fabry-Perot filter, see FIG. 3). The advantage of the resonant structure is the electric field enhancement obtained in the cavity 15. The latter fact means that much lower intensities are required for approaching non-linear regime.

It is noted, that another slope of a resonant structure can be used to achieve the decreasing reflectance (increasing transmittance). Furthermore, more complicated multiresonant structure embodiments, including multiple cavities, can be designed in order to further amplify the optical Kerr effect.

In analogy to FIG. 4, intensity dependent negative GDD values of the optical component, in particular the stack of refractive layers thereof, can be obtained. Accordingly, the phase of the incident light can be controlled in dependency on the intensity of the incident light.

Figure 5:
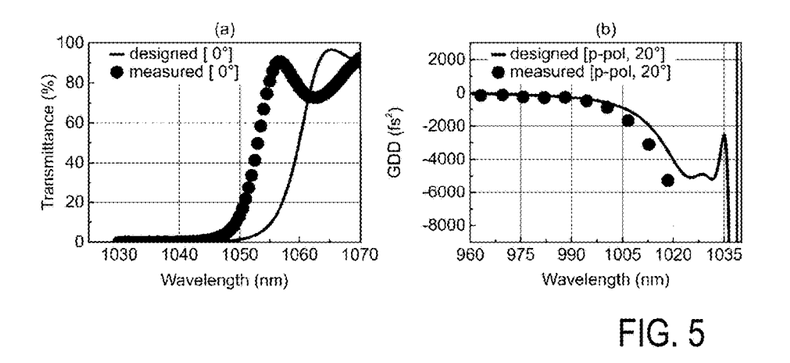
FIG. 5: graphical representations of further features of the optical component according to preferred embodiments of the invention.

As an example, the comparison of the designed and measured data for the optical component of type II for reflection operation, extremely responsive to the intensity increase and possessing controlled negative GDD, is presented in FIG. 5. Corresponding results can be obtained with the optical component of type I. FIG. 5(a) shows the designed transmittance (black dashed curve) and the measured data (via spectrophotometer, grey circles) for 0° angle of incidence. FIG. 5(b) shows the designed GDD (black dashed curve) and the measurement performed with a WLI (grey circles) for 20° angle of incidence and p-polarized light. Control of GDD characteristics additionally provides the control over the phase of the light. Despite the challenging for fabrication design (sensitive to manufacturing errors), the agreement between theory and experiment is quite good. Some deviation can be noticed in FIG. 5, however, this is not important as it can easily be compensated for by tuning the angle of incidence, adjusting the position of the slope.

Figure 6:
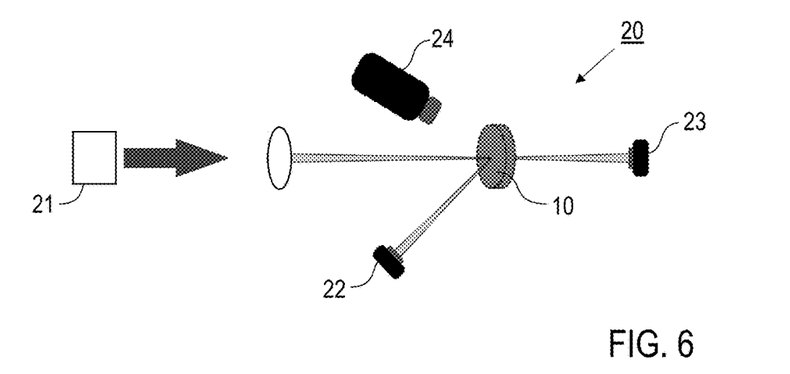
FIG. 6: a schematic illustration of a test set-up for characterizing inventive optical components.

Increasing and controlled non-linear change of reflectance is one of the main features employed with the inventive optical components. A measurement setup 20 used for characterization of sample components and for modulation depth measurements is shown in FIG. 6. The measurement setup 20 includes a laser source 21 with an Yb:YAG regenerative amplifier (p-polarization, central wavelength=1030 nm, repetition rate=50 kHz and pulse duration=1 ps). The laser beam is focused on an optical component 10 in order to provide intensities up to slightly below the damage threshold thereof. The pulse intensity was varied with a half-wave plate followed by a polarization cube placed in front of the focusing lens. The reflected and transmitted average power values were measured for each incident power value via a powermeter placed in two positions 22, 23. The temperature of the sample was monitored during the measurements as well (via IR camera 24). The sample was placed on a rotational stage in order to adjust the angle of incidence and achieve different initial reflectance-to-transmittance ratios.

Figure 7:
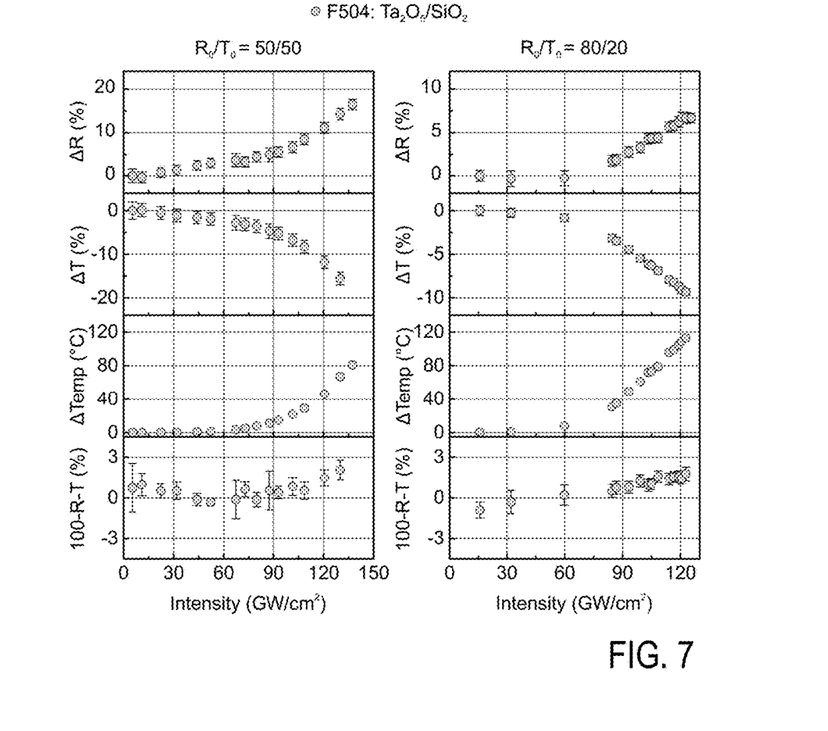
FIG. 7: graphical representations of further features of the optical component according to preferred embodiments of the invention.

An example characterization of a sample component of type II (edge structure), using the measurement setup 20 described is shown in FIG. 7. The graphs reveal the evidence that the reflectance (R) of the sample component increases by 7±2%, the transmittance (T) decreases by 9.3%±0.4%, the relative temperature grows by 113±2° C., and the total losses are on a scale of the experimental uncertainty for the case $R_0/T_0$=80%/20% (right graph). In fact, the temperature effect is estimated to be almost a half of the observed reflectance increase. Overall, the experimentally observed pre-damage behavior of the studied optical components occurs to be an interplay of the temperature-induced and nonlinear effects in the multilayer structures. Nevertheless, it is possible to almost fully circumvent the temperature influence by introducing an optical modulator.

The increase of reflectance and decrease of transmittance depend on the angle of incidence, which determines the initial proportion R to T ($R_0/T_0$). As one can see (FIG. 7), the absolute modifications of reflectance and transmittance are almost twice higher for the case of $R_0/T_0$=50%/50% compared to those of $R_0/T_0$=80%/20% for the same component of type II.

Additionally, with the measurement setup 20 described, it has been found that the inventive optical components do not show hysteresis phenomena with cycling increasing and decreasing intensities of incident light. This represents a further advantage over the structures described in [6].

Pump-probe measurements have shown the fast time response of the inventive optical component. A conventional degenerative pump-probe setup has been used with the laser source 21 of FIG. 6. Measuring time-resolved recovery curves of the optical component of type II (edge structure) for different initial $R_0/T_0$ at 85% of damage threshold fluence provided evidence that the reflectance change disappears very quickly after the pulse for all the initial conditions. A response time of the optical component shorter than 1 ps was obtained.

Applications of the inventive optical component for oscillator mode-locking are illustrated in FIGS. 8 and 9, which show optical resonator devices 30 with a plurality of cavity mirrors 31, 32 spanning a resonator beam path (linear resonators). Alternatively, ring resonators could be provided in analogue way. A mode-locked oscillator can be operated in the regime of either negative or positive dispersion. Dispersion compensation can be provided by a set of dispersive mirrors 32. The inventive optical component 10 and a gain medium 33 (laser crystal) are included in the resonator beam path. The laser gain medium can be chosen as a bulk crystal medium, as a slab crystal and as a thin-disk crystal. In case of thin-disk crystal medium this elements serves as one of the folding mirrors (in reflection) previously known from state of the art. In the optical resonator device 30, the optical component 10 is used as a mode-locking device.

FIGS. 8 and 9 show typical mode-locked oscillator configurations consisting of the laser gain medium 33, the linear or ring resonator beam path, the highly reflective mirrors 31 (curved mirrors of convex and concave shape) and dispersive mirrors 32. According to FIG. 8 the optical component 10 is operated in reflection, while a transmission configuration is shown in FIG. 9.

Preferably, the optical component 10 is positioned inside of the resonator cavity where the beam size is small enough to provide necessary intensity and thus cause the reflectance change. For instance, the optical component 10 can be located in the beam focus formed by two concave mirrors 31 as shown in FIG. 8 and simultaneously serve as an output coupler.

Many other cavity configurations can be considered providing the small beam size inside of the cavity. For instance, the small beam size can be achieved closer to one of the end mirrors 32. In this case, the optical component 10 can be used as an end-mirror or positioned closer to the end mirror as shown in FIG. 9.

The optical component 10 can be used as a mode-locker in the combination with other mode-locking techniques, for instance in combination with KLM. Furthermore, more than one optical component 10 can be used inside of the laser cavity. Additional optical components 10 can enhance the effect of self-amplitude modulation. Moreover, complimentary MAMs can be inserted inside of the cavity such that the overall bandwidth (or dispersion curve) provided by two or more optical components 10 is better than that provided by the single optical component 10.

The features of the invention disclosed in the above description, the drawings and the claims can be of significance both individually as well as in combination or subcombination for the realization of the invention in its various embodiments.

What is claimed is:

1. An optical component, being configured for modulating a light field incident on the optical component, wherein the light field has a predetermined center wavelength, comprising
a stack of refractive layers being arranged on a substrate, being made of materials having a third-order nonlinearity, and having alternatingly varying refractive indices (n), including a linear contribution ($n_0$) and a non-linear contribution ($n_2$), and determining reflectance and transmittance spectra of the optical component, wherein
the refractive layers are configured such that reflectance and transmittance of the optical component have a Kerr effect based dependency on the intensity (I) of the incident light field with $n=n_0+I \cdot n_2$, wherein
the refractive layers are made of at least one of dielectric and semiconductor layers, and
the non-linear contribution ($n_2$) is below $10^{-12}$ cm$^2$/W, wherein the optical component has at least one of the following features:
the dielectric layers are made of at least one of $Ta_2O_5$, $Nb_2O_5$, $HfO_2$, $TiO_2$, $ZrO_2$, $Al_2O_3$ and $SiO_2$, and
the semiconductor layers are made of at least one of Ge, Si and ZnSe.

2. The optical component according to claim 1, wherein the refractive layers are configured such that the reflectance and transmittance spectra of the optical component have a slope section including the center wavelength of the light field.

3. The optical component according to claim 2, wherein the slope section has a slope steepness of at least 5.

4. The optical component according to claim 2, wherein the slope section has a slope steepness of at least 7.

5. The optical component according to claim 2, wherein
the refractive layers are configured such that the slope section has decreasing reflectance and increasing transmittance at increasing wavelengths, and
the reflectance and the transmittance of the optical component are increasing and decreasing, respectively, at increasing amplitudes of the incident light field.

6. The optical component according to claim 2, wherein
the refractive layers are configured such that the slope section has increasing reflectance and decreasing transmittance at increasing wavelengths, and
the reflectance and the transmittance of the optical component are decreasing and increasing, respectively, at increasing amplitudes of the incident light field.

7. The optical component according to claim 2, wherein the slope section of the reflectance and transmittance spectra is at least one of an edge section and a resonance section of the reflectance and transmittance spectra.

8. The optical component according to claim 1, wherein the refractive layers are configured such that the reflectance and transmittance spectra of the optical component have a plateau section including the center wavelength of the light field.

9. The optical component according to claim 1, wherein the refractive layers have at least one of the features
   a number of the refractive layers is at least one of at least 2 and at most 1000, and
   a thickness of the stack of refractive layers is at least 1 nm and at most 1000 μm.

10. The optical component according to claim 1, wherein the refractive layers have at least one of the features
    a number of the refractive layers is at least one of at least 10 and at most 100, and
    a thickness of the stack of refractive layers is at least 5 nm and at most 15 μm.

11. The optical component according to claim 1, wherein the substrate has a thickness below 500 μm.

12. The optical component according to claim 1, wherein the substrate has a thickness below 300 μm.

13. The optical component according to claim 1, wherein the stack of refractive layers includes at least one full-wave cavity being resonant at least at the center wavelength of the light field.

14. The optical component according to claim 1, wherein the refractive layers are configured such that the reflectance and transmittance spectra include wavelengths in a range from 500 nm to 10 μm.

15. An optical resonator device, including
    a plurality of cavity mirrors spanning a resonator beam path, and
    at least one optical component according to claim 1.

16. The optical resonator device according to claim 15, wherein the at least one optical component is arranged as a reflective or as a transmissive component.

17. A method of modulating a light field, comprising the steps of
    directing the light field on an optical component according to claim 1, and
    providing a modulated light field in at least one of reflection and transmission relative to the optical component.

18. A method of manufacturing an optical component, being configured for modulating a light field incident on the optical component, wherein the light field has a predetermined center wavelength, comprising
    depositing a stack of refractive layers on a substrate, wherein the refractive layers are made of materials having a third-order nonlinearity and having alternatingly varying refractive indices (n), including a linear contribution ($n_0$) and a non-linear contribution ($n_2$), and determining reflectance and transmittance spectra of the optical component, wherein
    the refractive layers are configured such reflectance and transmittance of the optical component have a Kerr effect based dependency on the intensity (I) of the incident light field with $n=n_0+I \cdot n_2$,
    the refractive layers are made of at least one of dielectric and semiconductor layers, and
    the refractive layers are configured such that the non-linear contribution ($n_2$) is below $10^{-12}$ cm$^2$/W, and wherein the optical component has at least one of the following features:
    the dielectric layers are made of at least one of $Ta_2O_5$, $Nb_2O_5$, $HfO_2$, $TiO_2$, $ZrO_2$, $Al_2O_3$ and $SiO_2$, and
    the semiconductor layers are made of at least one of Ge, Si and ZnSe.

19. The method according to claim 18, wherein the optical component is configured for modulating at least one of an amplitude and a phase of the light field in dependency on the intensity (I) thereof.

* * * * *